(12) United States Patent
Adachi et al.

(10) Patent No.: US 6,492,820 B2
(45) Date of Patent: Dec. 10, 2002

(54) DISPLACEMENT MEASURING DEVICE

(75) Inventors: Satoshi Adachi, Kawasaki (JP);
Kenichi Nakayama, Kawasaki (JP);
Akihito Takahashi, Kawasaki (JP);
Toshihiro Hasegawa, Kawasaki (JP);
Masaaki Nagata, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/745,532

(22) Filed: Dec. 26, 2000

(65) Prior Publication Data

US 2001/0005139 A1 Jun. 28, 2001

(30) Foreign Application Priority Data

Dec. 28, 1999 (JP) ............................................. 11-373452

(51) Int. Cl.⁷ ............................................. G01R 27/126
(52) U.S. Cl. ....................................... 324/658; 324/662
(58) Field of Search ........................... 33/706; 324/658, 324/661, 662, 678, 686; 340/870.37; 359/696; 702/1.41

(56) References Cited

U.S. PATENT DOCUMENTS

| | | | | |
|---|---|---|---|---|
| 4,215,480 A | | 8/1980 | Fisher et al. ................... 33/706 |
| 4,586,260 A | * | 5/1986 | Baxter et al. ................... 33/706 |
| 5,068,653 A | * | 11/1991 | Klingler et al. ......... 340/870.37 |
| 5,812,427 A | * | 9/1998 | Nonoyama et al. .......... 702/141 |
| 5,822,133 A | * | 10/1998 | Mizuno et al. .............. 359/696 |
| 6,046,596 A | * | 4/2000 | Schaenzer et al. .......... 324/662 |
| 6,168,080 B1 | * | 1/2001 | Verschuur et al. ...... 235/462.01 |
| 6,274,428 B1 | * | 8/2001 | Wu ............................. 438/255 |
| 6,292,001 B1 | * | 9/2001 | Susaski et al. .............. 324/662 |
| 6,326,794 B1 | * | 12/2001 | Lundquist et al. .......... 324/678 |

* cited by examiner

Primary Examiner—Christine Oda
Assistant Examiner—Walter Benson
(74) Attorney, Agent, or Firm—Oliff & Berridge, PLC

(57) ABSTRACT

An electrostatic capacitive encoder includes a scale and a sensor head, which is arranged opposing to and relatively movable to the scale. A plurality of protrusions for sliding, processed in a certain pattern, are located on a flat region surrounding a transmitting electrodes and receiving electrodes of the sensor head.

10 Claims, 6 Drawing Sheets

FIG. 2
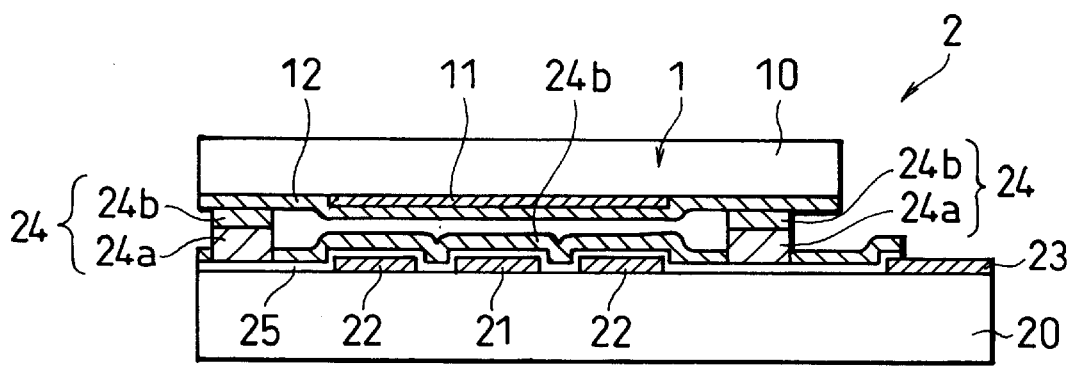
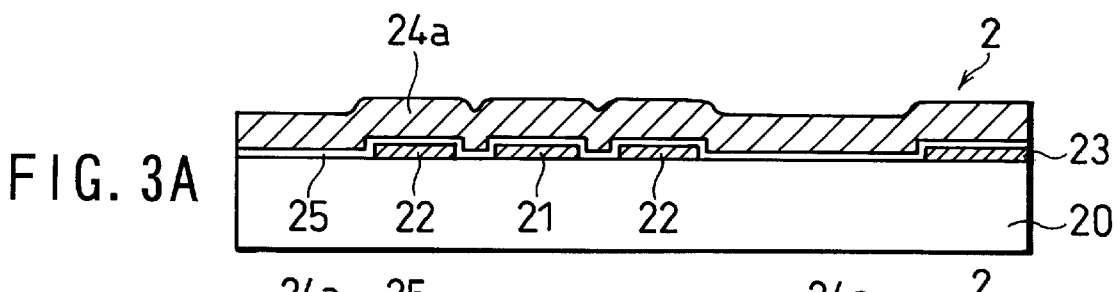
FIG. 3A
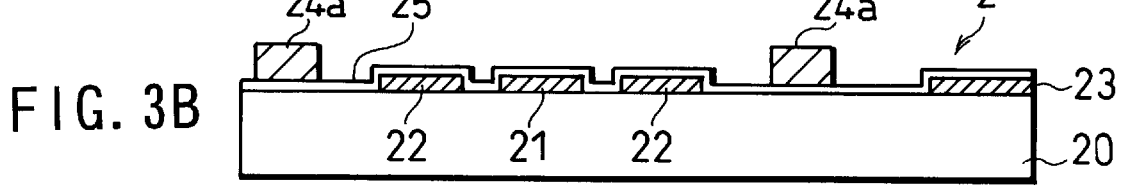
FIG. 3B
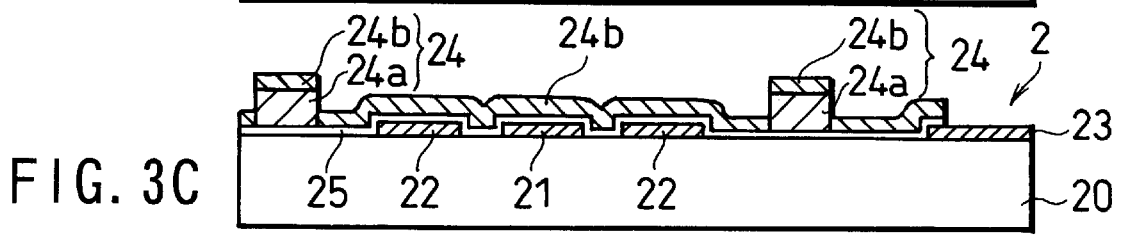
FIG. 3C
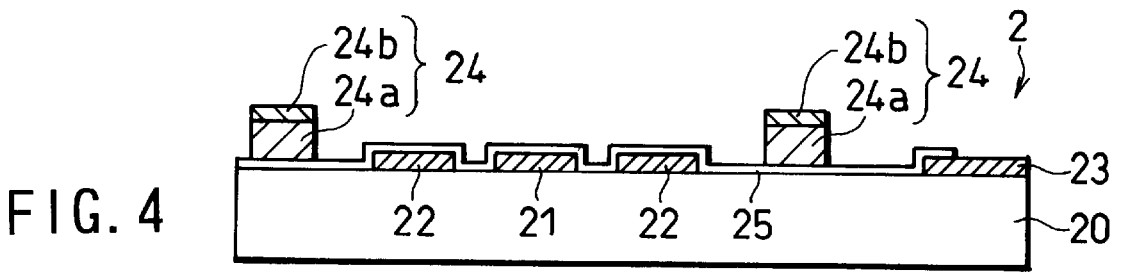
FIG. 4

DISPLACEMENT MEASURING DEVICE

BACKGROUND OF THE INVENTION

1. Field of the Invention

The present invention relates to a displacement measuring device such as electrostatic capacitive, photoelectric and electromagnetic inductive encoders.

2. Description of the Related Art

In an electrostatic capacitive encoder mounted on a small length-measuring device such a linear scale, a scale is arranged opposing to a sensor head, interposing an air gap between them. For use in specifically sustaining the air gap between the scale and the sensor head, actually available systems include a system that accommodates the sensor head within a frame having three or more protrusions for sliding in order to oppose the sensor head to the scale, and a system that employs bearings.

These conventional systems are difficult to adjust the gap, however, when a more compact and smaller gap is required. Then, another system can be considered to slide the scale, directly contacting with the sensor head. This system requires a protection film for protecting electrodes on both the sensor head and scale. This protection film is required to have an excellent electrical insulation, planarity and wearability and a small coefficient of friction.

An insulating film, for example, a silicon oxide film, which is deposited through chemical vapor deposition (CVD), can be considered as such the protection film. A diamond-like carbon (DLC) film, which is deposited by plasma CVD, can achieve a much further excellent wearablity and much smaller coefficient of friction compared to the CVD silicon oxide film.

The following problems occur, however, when the DLC film is formed by plasma CVD as the protection film on the entire surface of the sensor head. First, there are steps of about 1 μm depth/height on the surface of the sensor head and scale, due to electrode arrangement, worsening a tight adhesion of the DLC film to the surface. As a result, a sufficient durability can not be attained. In addition, the protection film is required to have a flat surface, but the surface of the DLC film reflects the steps at the electrode portion. Thus, a planarization process is also required for planarizing the DLC film. As a planarization technology, CMP (Chemical Mechanical Polishing) is well known, for example. However, since the DLC film has a high hardness, such a planarization process can not be applied easily to the DLC film.

SUMMARY OF THE INVENTION

The present invention has been made in consideration of the above situations and accordingly has an object to provide a displacement measuring device having an easily adjustable gap and such a sliding property that exhibits an excellent durability.

The present invention is provided with a displacement measuring device, which comprises a scale having a signal transfer section arranged along a measurement axis; a sensor head arranged opposing to and relatively movable to the scale, the sensor head having a signal transmitting section and a signal receiving section, for transmitting and receiving a signal via the signal transfer section; and a plurality of protrusions, located on a flat region in at least one of opposite surfaces of the scale and sensor head, for sliding on the other surface.

In the displacement measuring device according to the present invention, the protrusions are located on a plurality of positions in the flat region to avoid steps produced from arrangement of electrodes in the sensor head and scale. This allows the protrusions to tightly contact the ground material and slide with an excellent durability even though a DLC film is employed for the protrusions. In addition, it does not require any process for planarization as in the case of forming the DLC film over the entire surfaces of the sensor head and scale.

Preferably, in the displacement measuring device according to the present invention, the protrusions may particularly be composed of a laminated film consisting of a buffer film and a DLC film deposited thereon. Desirably, the buffer layer has a tight adhesion to the ground material and DLC film, and a larger hardness in some extent, though it is not required as high as that of the DLC film. Specifically, the buffer film may be formed of a film of insulator such as silicon oxide and silicon nitride formed by plasma CVD or spattering. The buffer film may also comprise a film of semiconductor such as polysilicon, if the protrusions are formed at locations where no electrode is arranged.

A period of time for film deposition is extremely long when a film thickness required to achieve a necessary gap is ensured only with the DLC film, though it can be reduced by use of a combination of the DLC film with another insulating film.

Further, when the protrusions are formed of the buffer and DLC films, the DLC film preferably extends from the protrusions over the electrode arrangement region. This allows the DLC film to serve as a protection film for the electrode arrangement region to prevent foreign materials from mixing into the electrode arrangement region.

Furthermore, when the electrode arrangement region in a sensor head substrate or scale substrate is previously formed to have a recessed region and electrodes are disposed within the recessed region, the protrusions are not required to have a much larger thickness. In this case, the protrusions can be formed of the DLC film alone.

Further, the protrusions formed of the buffer and DLC films are arranged on one of the sensor head and scale, the DLC film is preferably formed on the entire surface of the other as a protection film. This can achieve protection of electrodes in the other and attain an excellent wearable sliding property with a small coefficient of friction.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIG. 2 is a cross sectional view of the encoder of the same embodiment;

FIGS. 3A–3C show a process of forming a film for sliding in a sensor head of the same embodiment;

FIG. 4 is a cross sectional view showing a sensor head according to another embodiment;

DETAILED DESCRIPTION OF THE PREFERRED EMBODIMENTS

Figure 1:
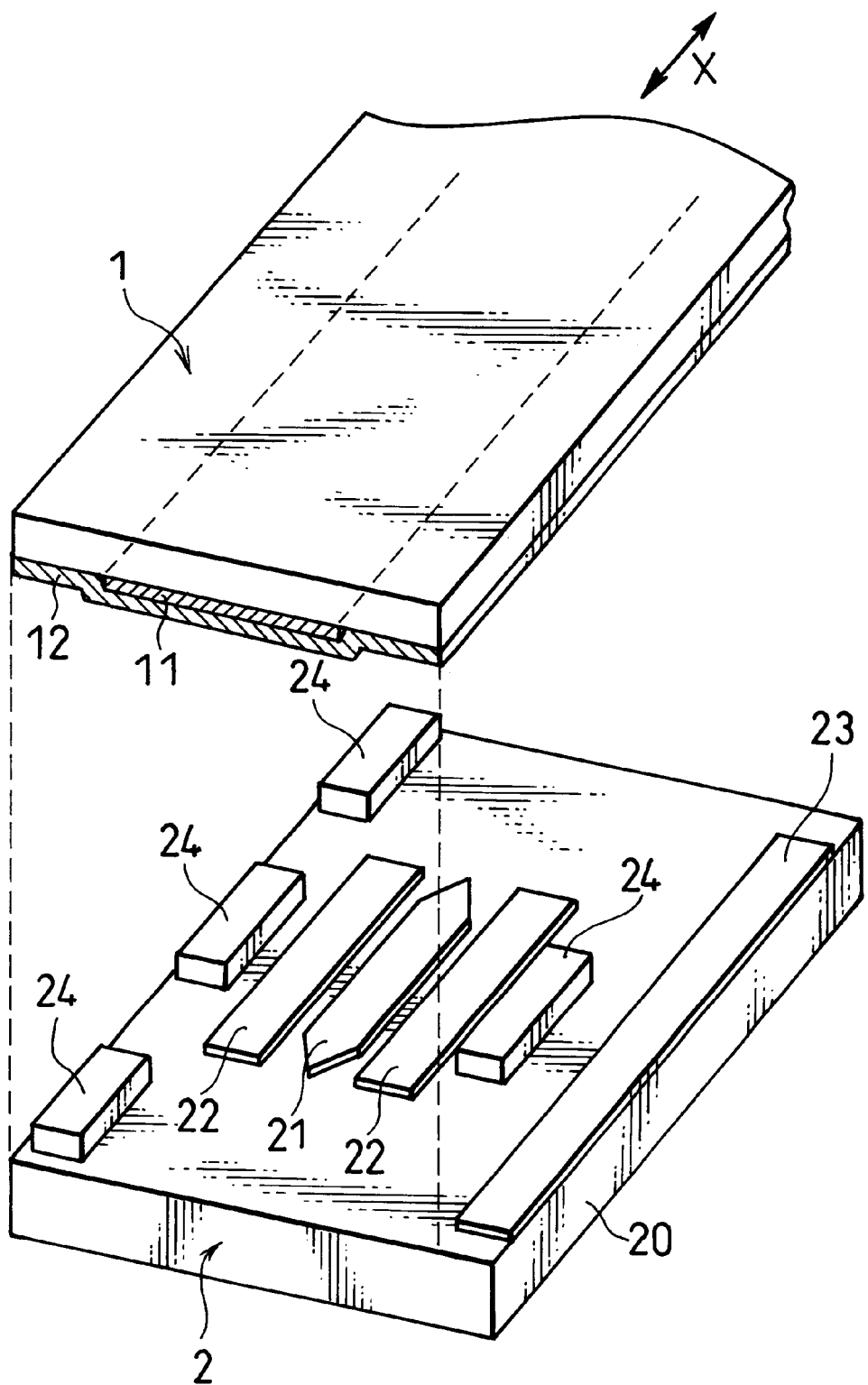
FIG. 1 is an exploded perspective view of an electrostatic capacitive encoder according to an embodiment of the present invention.

FIG. 1 is an exploded perspective view of an electrostatic capacitive encoder according to an embodiment of the present invention and FIG. 2 is a cross sectional view thereof in a situation where a scale 1 opposes to a sensor head 2. As shown in FIG. 1, the sensor head 2 comprises a substrate 20 such as glass. It also comprises, formed on the substrate, transmitting electrodes 21 (commonly having a two-to four-layered structure), receiving electrodes 22 (commonly having a two-to three-layered structure), and terminals 23 for connecting these electrodes to an external circuit. The surface of the sensor head 2, which faces on the scale 1, is such a surface that has protruded and recessed regions due to electrode arrangement (of the transmitting and receiving electrodes 21 and 22). Protrusions 24 for sliding are pattern-formed on a plurality of locations in a flat region, without the electrode arrangement, within the surface of the sensor head 2, facing on the scale 1.

The protrusions 24 have slim rectangle patterns elongated along a measurement axis x and they are arrayed in two lines so as to interpose the transmitting and receiving electrode sections 21 and 22 therebetween. In the example of FIG. 1, three protrusions 24 are discretely arranged on one line and one on the other. The protrusions 24 are formed of a laminated film and have flat surfaces as described later.

As shown in FIG. 2, the transmitting and receiving electrodes 21 and 22 of the sensor head 1 are covered with a protection film 25 that may be formed of a plasma-CVD silicon oxide. The protrusions 24 are formed of a laminated film on the protection film 25, which comprises a buffer film 24a of silicon oxide formed by plasma-CVD and a DLC film 24b formed by plasma-CVD. The DLC film 24b extends over other regions than the protrusions 24 and is employed as a protection film for the transmitting and receiving electrodes 21 and 22.

The scale 1 comprises a substrate 10 such as glass and a transfer electrodes 11 formed on the substrate and arranged along the measurement axis x for capacitively coupling to the transmitting and receiving electrodes 21 and 22. A DLC film 12 is formed by plasma-CVD to cover the entire surface of the substrate, on which the transfer electrodes 11 have been formed.

FIGS. 3A–3C show a process of forming the protrusions 24 in the sensor head 2 of this embodiment. In a film formation process, plasma CVD technology is employed, which is able to form a film at a low temperature. First, as shown in FIG. 3A, the buffer film 24a is deposited on the whole surface of the substrate 20, on which the transmitting, receiving and transfer electrodes 21, 22 and terminals 23 have been formed. Next, the buffer film 24a is patterned by lithography and etching technologies, as shown in FIG. 3B, to stay only on the locations of the protrusions 24. Subsequently, the DLC film 24b is deposited on the entire surface as shown in FIG. 3C. Thus, the protrusions 24 are composed of a laminated structure consisting of the buffer and DLC films 24a and 24b. The transmitting and receiving electrodes 21 and 22 are covered with the DLC film 24b. The terminals 23 can be exposed finally by etching or by providing a mask at the time of film deposition.

In this embodiment, as the protrusions 24 have the laminated structure, they can increase their height by a thickness of the buffer film 24a. Accordingly, even though the DLC film 24b is thin, the surfaces of the protrusions 24 can be protruded upwardly beyond the surfaces of the transmitting and receiving electrodes 21 and 22. This enables the sensor head 2 to slide relative to the scale 1 while ensuring a gap required between opposing electrodes.

In this embodiment, the protrusions 24 are arranged, not on the entire surface of the sensor head 2, but on the flat region discretely, circumventing the transmitting and receiving electrodes. Therefore, poor adhesion of the film for sliding due to steps can not occur and an excellent sliding property can be achieved. In addition, a process of planarization is not required, unlike when it is employed in forming a protection film for sliding over the entire surface of the sensor head.

Further, in this embodiment, the laminated film consisting of the buffer film 24a and the DLC film 24b deposited thereon is employed as the protrusions 24, so the DLC film can guarantee mechanical strength and wearability against sliding motions. In addition, the use of such the laminated structure can shorten the film formation time and reduce the manufacturing cost, unlike the case where the DLC film alone must ensure the height required. Further, the transmitting and receiving electrodes 21 and 22 are covered with the DLC film to achieve an excellent durability against the mixture of foreign materials.

FIG. 4 shows a sensor head 2 according to another embodiment. This embodiment is similar to the preceding one with respect to the laminated structure of the protrusions 24 consisting of the buffer film 24a and the DLC film 24b, except that the transmitting and receiving electrodes 21 and 22 are not covered with the DLC film. This structure can be obtained by depositing the buffer film 24a and the DLC film 24b, and successively pattering the laminated film integrally.

Figure 5:
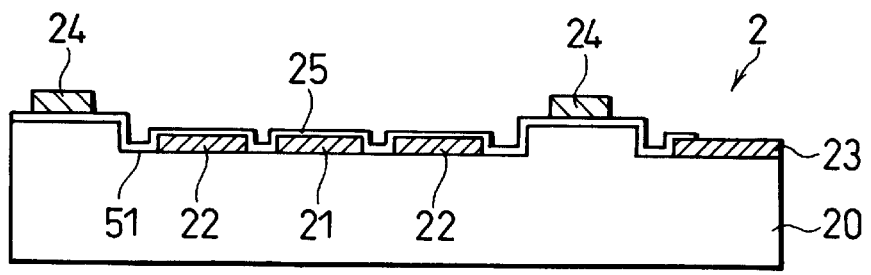
FIG. 5 is a cross sectional view showing a sensor head according to another embodiment.

FIG. 5 shows a sensor head 2 according to a further embodiment. In this embodiment, a recessed region 51 is previously formed in the substrate 20 of the sensor head 2. The transmitting and receiving electrodes 21 and 22 are formed within the recessed region 51. The protrusions 24 are patterned only with the DLC film on a flat, protruded region at the periphery of the recessed region 51 in which the transmitting and receiving electrodes 21 and 22 are formed.

In this embodiment, selection of a depth of the recessed region 51 makes the upper surfaces of the transmitting and receiving electrodes 21 and 22 be approximately equal to the flat surface of the protruded region on which no electrode are arranged. Therefore, the protrusions 24 can be formed on the protruded flat surface with a thin DLC film only and no buffer film.

Figure 6A:
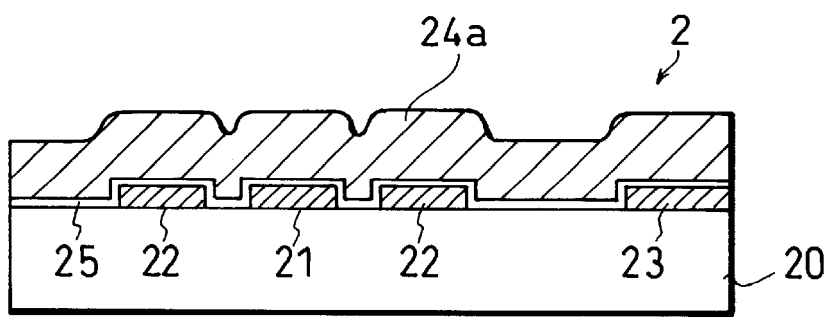
FIGS. 6A–6C show a process of forming a film for sliding in a sensor head according to another embodiment.
Figure 6B:
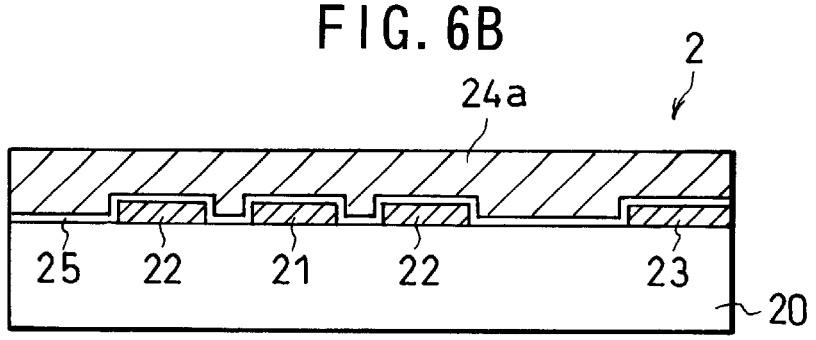
Figure 6C:
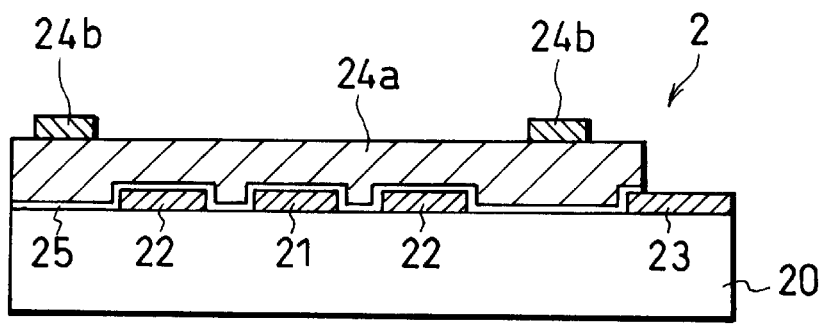

FIGS. 6A–6C show a process of forming a sensor head 2 according to an alternative embodiment of FIGS. 3A–3C. After forming the transmitting, receiving electrodes 21, 22 and terminals 23 on the substrate 20, the buffer film 24a is deposited thereon as same as the process of FIG. 3A. Then, the upper surface of the buffer film 24a is planarized by CMP process as shown in FIG. 6B. The DLC film 24b is deposited and patterned on the planarized buffer film 24a as shown in FIG. 6C. The terminals 23 are finally exposed.

In this embodiment, as the buffer film 24a is planarized, the DLC film 24a or the main part of the protrusion 24 has an improved adhesion. The DLC film 24a can be thinned and the film formation time can be reduced. The DLC film 24a is hard and so is difficult to be planarized. In contrast to this, the buffer film 24a can be planarized easily if it is composed of a CVD silicon oxide or the like.

In the preceding embodiments, a film of fluororesin such as Teflon® may be employed, instead of the DLC film. The use of the fluororesin film can also achieve a small coefficient of friction and excellent wearability. Silicon nitride, polysilicon and amorphous silicon may also be employed for the buffer film as well as silicon oxide.

Application of a lubricant on the surface of the protrusion further improves durability.

Figure 7:
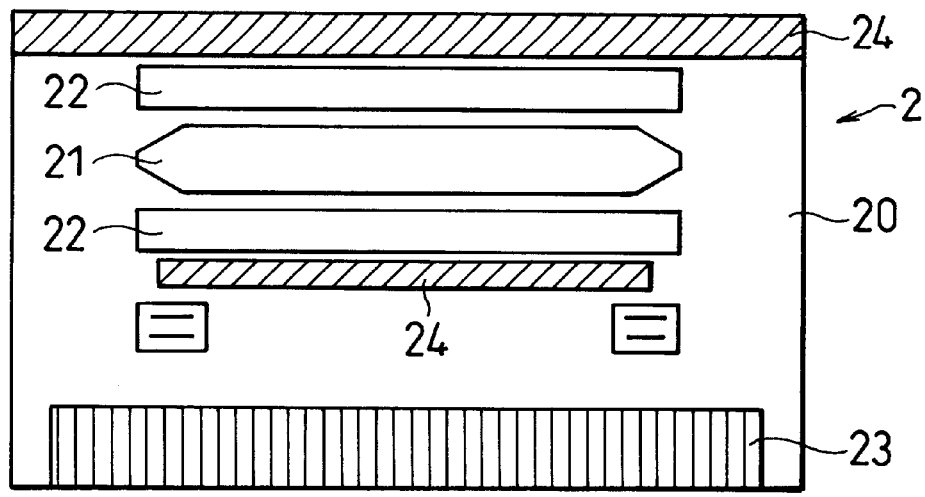
FIG. 7 shows another pattern example of a film for sliding.
Figure 8:
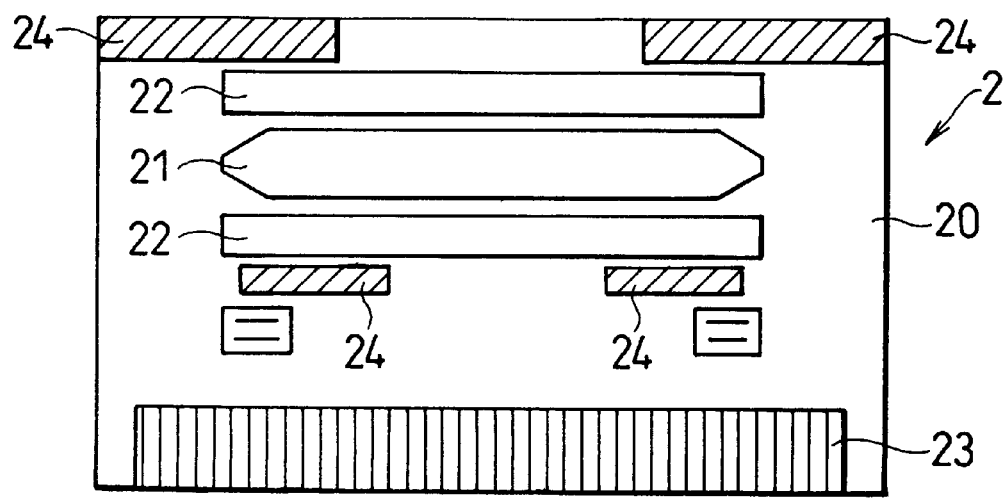
FIG. 8 shows another pattern example of a film for sliding.
Figure 9:
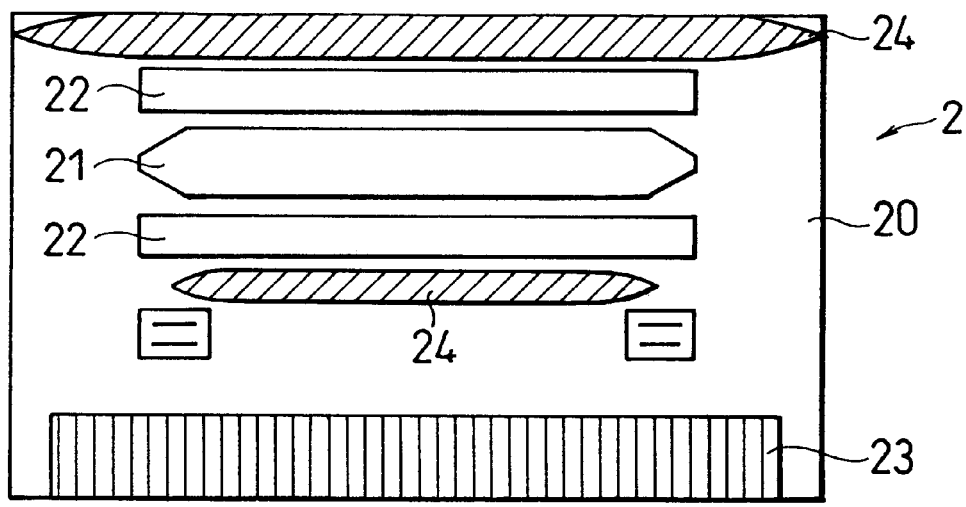
FIG. 9 shows another pattern example of a film for sliding.
Figure 10:
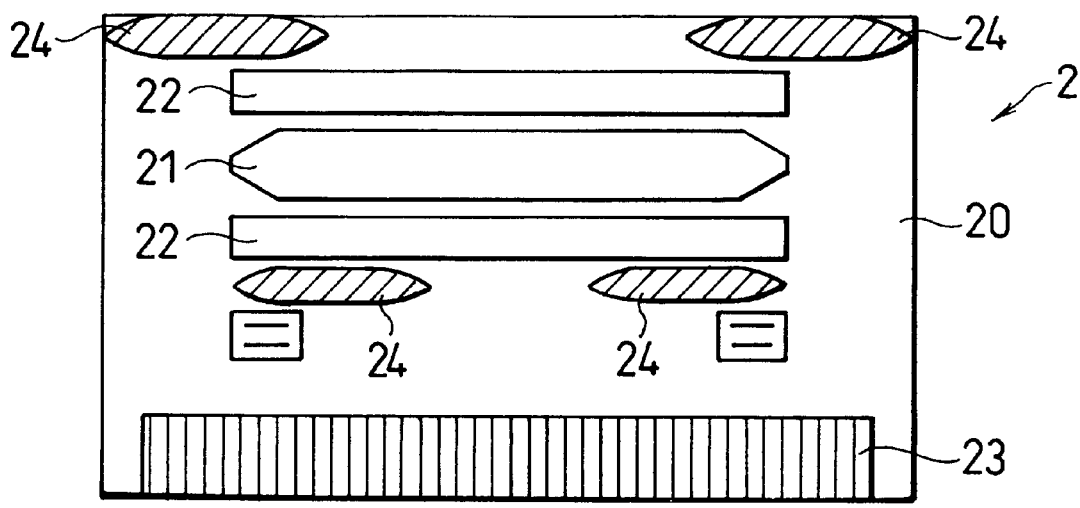
FIG. 10 shows another pattern example of a film for sliding.
Figure 11:
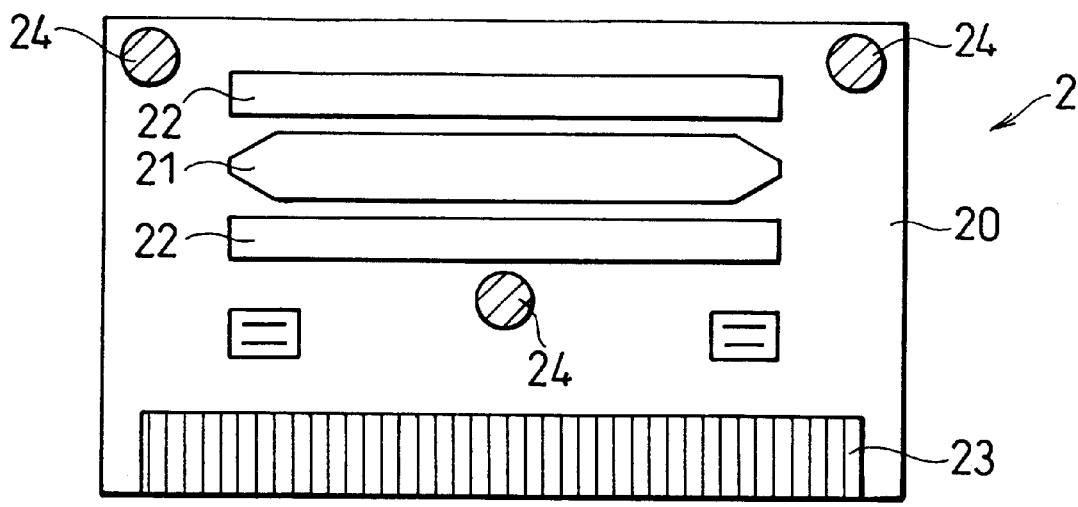
FIG. 11 shows another pattern example of a film for sliding.
Figure 12:
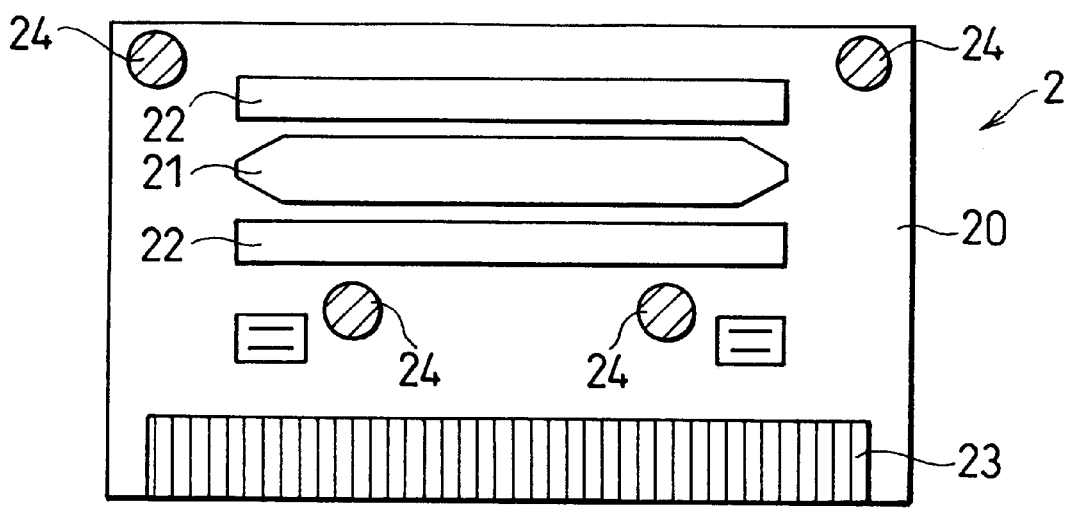
FIG. 12 shows another pattern example of a film for sliding.

FIGS. 7–12 show different examples of patterns and arrangements of the protrusions 24 located on the sensor head 2. FIG. 7 exemplifies the protrusions 24 patterned in two continuous lines interposing the transmitting and receiving electrodes 21 and 22 therebetween. FIG. 8 exemplifies the protrusions 24 patterned in two discontinuous lines interposing the transmitting and receiving electrodes 21 and 22 therebetween. FIGS. 9 and 10 show examples modifying the protrusions 24 of FIGS. 7 and 8 into slim, oval patterns. FIGS. 11 and 12 show examples modifying the protrusions 24 into circular patterns.

In the preceding embodiments, the protrusions are patterned on the sensor head, though they may be contrarily patterned on the scale. In the latter case, the protrusions are patterned in two lines, at an interval less than at least the dimension of the sensor head, along the longitudinal direction of the scale (the measurement axis x). In this case, it is also required to cover wiring sections on the sensor head with a protection film. Alternatively, a design is required to eliminate any wiring from a portion that contacts the protrusion of the scale through the use of the backside wires of the sensor head for connection wiring between the electrodes and terminal of the sensor head via through-holes.

The present invention may also be applied to photoelectric and electromagnetic inductive encoders while the preceding embodiments exemplify the electrostatic capacitive encoder.

As obvious from the forgoing, in the displacement measuring device according to the present invention, the protrusions for sliding are patterned on either the sensor head or the scale, circumventing the electrode arrangement section, using a hard film such as DLC as the film for sliding. Therefore, the device can achieve an easily adjustable gap and such a sliding property that exhibits an excellent durability.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A displacement measuring device, comprising:
   a scale having a signal transfer section arranged along a measurement axis;
   a sensor head arranged opposing to and relatively movable to said scale, said sensor head having a signal transmitting section and a signal receiving section, for transmitting and receiving a signal via said signal transfer section;
   a plurality of protrusions, located on a flat region in at least one of opposite surfaces of said scale and said sensor head, for sliding on the other surface; and
   wherein said protrusions are formed of a laminated film comprising of a buffer film and a diamond-like carbon film deposited on said buffer film.

2. The displacement measuring device according to claim 1, wherein said buffer film comprises one selected from the group consisting of silicon oxide, silicon nitride, polysilicon and amorphous silicon films.

3. The displacement device according to claim 1, wherein said the other surface is covered with said diamond-like carbon film.

4. The displacement measuring device according to claim 1, wherein said protrusions are located on at least one of a flat region surrounding said signal transmitting section and signal receiving section of said sensor head and a flat region surrounding said signal transfer section of said scale.

5. The displacement measuring device according to claim 1, wherein said protrusions are formed of a laminated film consisting of a buffer film, formed on a flat region surrounding said signal transmitting section and signal receiving section of said sensor head, and a diamond-like carbon film deposited on said buffer film, and wherein said diamond-like carbon film extends from said protrusions over said signal transmitting section and signal receiving section as a protection film for said signal transmitting section and signal receiving section.

6. The displacement measuring device according to claim 1, wherein said protrusions are formed of a buffer film, formed on the entire surface of said sensor head and having a planarized upper surface, and a diamond-like carbon film deposited and patterned on said buffer film.

7. The displacement measuring device according to claim 1, wherein said sensor head includes a sensor head substrate having a recessed region formed therein, said signal transmitting section and signal receiving section being formed in said recessed region of said substrate, and wherein said protrusions are patterned with said diamond-like carbon film and formed on a flat, protruded region of said sensor head substrate.

8. The displacement measuring device according to claim 1, wherein said protrusions are patterned and elongated along said measurement axis in two lines so as to interpose said signal transmitting section and signal receiving section.

9. The displacement measuring device according to claim 1, wherein said protrusions are discontinuously patterned along said measurement axis so as to interpose said signal transmitting section and signal receiving section.

10. The displacement measuring device according to claim 1, said displacement measuring device is an electrostatic capacitive encoder, wherein said encoder includes a transmitting electrode and a receiving electrode both formed on said sensor head, and a transfer electrode formed on said scale for capacitively coupling to said transmitting and receiving electrodes.

* * * * *